United States Patent
Pearson (10) Patent No.: US 10,341,673 B2
(45) Date of Patent: Jul. 2, 2019

(54) APPARATUSES, METHODS, AND CONTENT DISTRIBUTION SYSTEM FOR TRANSCODING BITSTREAMS USING FIRST AND SECOND TRANSCODERS

(71) Applicant: Integrated Device Technology, Inc., San Jose, CA (US)

(72) Inventor: Eric C. Pearson, Conestogo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 494 days.

(21) Appl. No.: 13/889,778

(22) Filed: May 8, 2013

(65) Prior Publication Data

US 2014/0334532 A1 Nov. 13, 2014

(51) Int. Cl.
*H04N 19/40* (2014.01)
*H04N 19/91* (2014.01)

(52) U.S. Cl.
CPC ............. *H04N 19/40* (2014.11); *H04N 19/91* (2014.11)

(58) Field of Classification Search
USPC ........................................ 375/240.01–240.03
See application file for complete search history.

(56) References Cited

U.S. PATENT DOCUMENTS

| | | | |
|---|---|---|---|
| 7,061,410 B1 | 6/2006 | Pearson et al. | |
| 7,605,722 B2 | 10/2009 | Beack et al. | |
| 8,456,532 B1 * | 6/2013 | Petkevich | H04N 5/23206 348/207.1 |
| 8,552,890 B2 * | 10/2013 | Kim | H03M 7/4018 341/51 |
| 8,767,838 B1 * | 7/2014 | Xin | H04N 19/439 19/439 |
| 2005/0147172 A1 * | 7/2005 | Winger | H03M 7/4006 375/240.23 |
| 2005/0147173 A1 * | 7/2005 | Winger | H03M 7/4006 375/240.23 |
| 2005/0174172 A1 * | 8/2005 | Sirito-Olivier | H03F 1/302 330/98 |

(Continued)

FOREIGN PATENT DOCUMENTS

EP 2579595 A2 4/2013

OTHER PUBLICATIONS

Marpe et al., "Context-Based Adaptive Binary Arithmetic Coding in the H.264/AVC Video Compression Standard", Jul. 2003, vol. 13, No. 7, p. 261.*

(Continued)

*Primary Examiner* — William C Vaughn, Jr.
*Assistant Examiner* — Joseph Daniel A Towe
(74) *Attorney, Agent, or Firm* — Christopher P. Maiorana, PC (57) ABSTRACT

Examples of systems, apparatuses, and methods for to transcoding a bitstream are described herein. An example content distribution system may include an interconnect configured to provide encoded video data from an encoder to a decoder. The interconnect is configured to receive a bitstream including the encoded video data from the encoder. The bitstream is encoded using a first lossless coding methodology. The interconnect including a transcoder configured to transcode the bitstream using a second lossless coding methodology to provide a transcoded bitstream.

18 Claims, 5 Drawing Sheets

(56) References Cited

U.S. PATENT DOCUMENTS

| | | | | |
|---|---|---|---|---|
| 2006/0133513 | A1* | 6/2006 | Kounnas | G06F 9/5055 |
| | | | | 375/240.26 |
| 2008/0246637 | A1* | 10/2008 | Chen | H03M 7/4006 |
| | | | | 341/51 |
| 2008/0267033 | A1* | 10/2008 | Morinaga | G11B 20/00 |
| | | | | 369/84 |
| 2009/0010338 | A1* | 1/2009 | Wang | H04N 19/563 |
| | | | | 375/240.16 |
| 2009/0224950 | A1* | 9/2009 | Xu | H03M 7/4006 |
| | | | | 341/51 |
| 2010/0229210 | A1* | 9/2010 | Sharp | H04N 7/173 |
| | | | | 725/109 |
| 2011/0142419 | A1 | 6/2011 | Zou et al. | |
| 2012/0044987 | A1* | 2/2012 | Bennett | G09G 3/003 |
| | | | | 375/240.02 |
| 2012/0076155 | A1* | 3/2012 | Kounnas | H04N 21/438 |
| | | | | 370/465 |
| 2012/0147972 | A1* | 6/2012 | Miyazaki | H04N 19/70 |
| | | | | 375/240.23 |
| 2013/0077696 | A1 | 3/2013 | Zhou | |

OTHER PUBLICATIONS

Marpe et al., "Context-Based Adaptive Binary Arithmetic Coding in the H.264/AVC Video Compression Standard", IEEE Transaction on Circuits and Systems for Video Technology, vol. 13, No. 7, Jul. 2013.*

Xin et al., "Digital Video Transcoding", Proceedings of the IEEE, vol. 93, No. 1, Jan. 2015.*

International Search Report and Written Opinion for PCT/US2014/032682 dated Aug. 21, 2014.

* cited by examiner

APPARATUSES, METHODS, AND CONTENT DISTRIBUTION SYSTEM FOR TRANSCODING BITSTREAMS USING FIRST AND SECOND TRANSCODERS

TECHNICAL FIELD

Embodiments described relate to video encoding, including examples of transcoding a bitstream.

BACKGROUND

Typically, signals, such as audio or video signals, may be digitally encoded for transmission to a receiving device. Video signals may contain data that is broken up in frames over time. Due to bandwidth requirements, baseband video signals are typically compressed using video encoders prior to transmission and/or storage. Video encoders may employ a coding methodology to encode macroblocks within a frame using one or more coding methodologies. In many video encoding standards, such as MPEG-1, MPEG-2, MPEG-4, H.261, H.262, H.263, H.264, etc., a macroblock denotes a square region of pixels, which may be 16×16 in size, for example. Most of the coding processes (e.g. motion compensation, mode decision, quantization decision, etc.) occur at the level of a macroblock. In the HEVC standard, the concept of macroblock is extended to larger block size referred to as a coding unit.

According to many coding standards, video encoders and/or decoders may include entropy encoders and/or decoders that may encode and/or decode coded macroblocks using lossless compression codecs. The compression codecs used may be proprietary, but most often are based upon standards to improve interoperability. Several compression codecs used in entropy encoders and/or decoders are available, including those implementing arithmetic coding schemes and non-arithmetic coding schemes. Arithmetic coding schemes generally refer to power lossless entropy coding used by standards to maximize compression while improving video quality. Context adaptive arithmetic coding standards may further improve the video quality. Some video encoders and/or decoders, for reasons of power, latency, computational complexity, licensing, or compatibility requirements, may limit compression codecs that are available for compressing data. Thus, such video encoders may compress data using compression codecs that are less efficient than alternative compression codecs, such as the arithmetic coding codecs. Use of a less efficient compression codec may increase bandwidth necessary to transmit the encoded bitstream which was not compressed in a more efficient manner, and/or may reduce video quality as compared with more efficient compression codec. As an example, a royalty-free web video coding (WebVC) standard precludes the use of a context-adaptive binary arithmetic coding (CABAC) methodology, which may be a more efficient data compression codec and have higher video quality than other compression codecs.

DETAILED DESCRIPTION

Examples of methods and apparatuses for transcoding a bitstream are described herein. Certain details are set forth below to provide a sufficient understanding of embodiments of the disclosure. However, it will be clear to one having skill in the art that embodiments of the disclosure may be practiced without these particular details, or with additional or different details. Moreover, the particular embodiments described herein are provided by way of example and should not be used to limit the scope of the disclosure to these particular embodiments. In other instances, well-known video components, encoder or decoder components, circuits, control signals, timing protocols, and software operations have not been shown in detail in order to avoid unnecessarily obscuring the disclosure.

Encoders and decoders described herein may encode and/or decode bitstreams in particular units, referred to as coding units herein. In some examples, a coding unit may be a macroblock, however, other sizes or types of coding units may also be used.

Generally, embodiments described herein include systems having at least one transcoder positioned between an encoder and a decoder. For example, an encoder may provide an encoded bitstream in a packetized transport stream to an interconnect (e.g. a network or other communication or storage mechanism between the encoder and decoder). The encoder may utilize a first encoding methodology (e.g. CAVLC). The interconnect itself may provide a transcoder that may convert the encoded bitstream to a bitstream encoded using a different coding methodology (e.g. CABAC) that may not have been available at the encoder. The interconnect may further include another transcoder in some embodiments that may convert the bitstream back to a bitstream encoded in accordance with the methodology utilized by the initial encoder (e.g. CAVLC).

Figure 1:
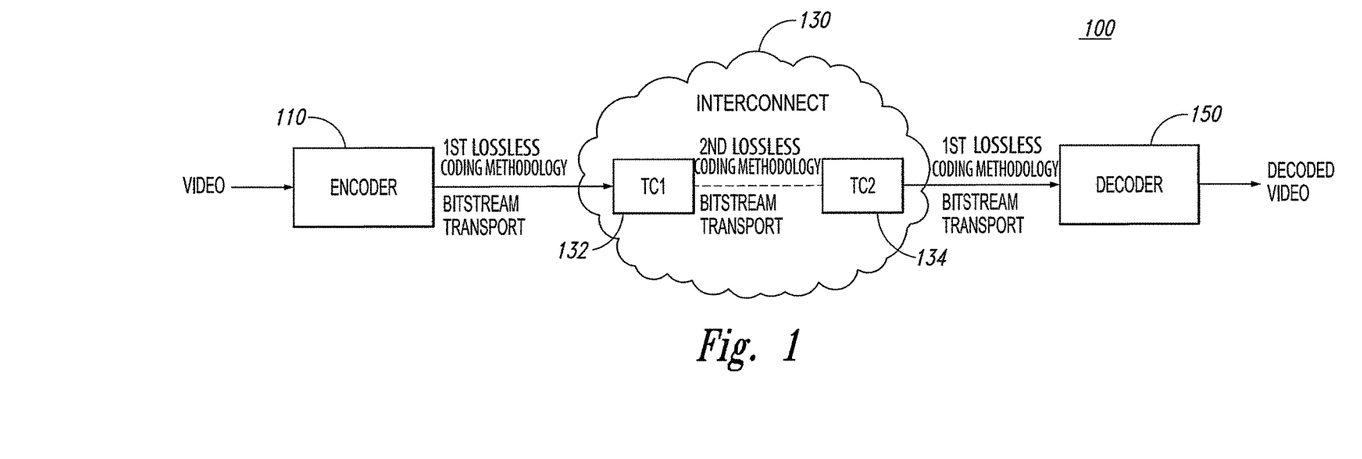
FIG. 1 is a block diagram of a content distribution system including an interconnect having first and second transcoders according to an embodiment of the disclosure.

FIG. 1 is a block diagram of a content distribution system 100 according to an embodiment of the disclosure. The content distribution system 100 may include an encoder 110 that may provide a bitstream of encoded video content that is encoded using a first lossless coding methodology to an interconnect 130. The interconnect 130 may transcode the received bitstream using a second lossless coding methodology at a first transcoder 132, and may provide the transcoded bitstream to a second transcoder 134 of the interconnect 130. The second transcoder 134 may transcode the transcoded bitstream using the first lossless coding methodology to encode a second bitstream, and may provide the second bitstream to a decoder 150. The decoder 150 may provide decoded video content by decoding the second bitstream. Transcoding the bitstream at the first transcoder 132 using the second lossless coding methodology may reduce bandwidth and/or improve video quality of over the bitstream transport between the first transcoder 132 and second transcoder 134 as compared with transmitting a bitstream encoded based on the first lossless coding methodology alone. The encoder 110, the interconnect 130, the first transcoder 132, the second transcoder 134, and/or the decoder 150 may be implemented in hardware, software, firmware, or combinations thereof, and may include control logic, logic gates, processors, memory, and/or any combination or sub-combination of the same.

The encoder 110 may receive respective coding units via a video channel and encode them to provide an encoded bitstream to the transport stream at an output. Examples of coding units may include frames, sub-frames, regions, macroblocks, etc. In the interest of clarity, operation of the encoder 110 will be discussed herein in terms of frames as coding units, however the encoder 110 may operate in other examples on other coding units. The encoder 110 may encode the frames, for instance, at a macroblock level. Each macroblock may be encoded in intra-coded mode, inter-coded mode, bidirectionally, or in any combination or sub-combination of the same. As an example, the encoder 110 may receive frames from the video channel and encode the frames. The frames (or other coding units) may be encoded in accordance with one or more encoding methodologies or standards, such as, but not limited to, MPEG-2, MPEG-4, H.263, H.264, and/or HEVC. Generally, encoding methods may aim to minimize the joint cost for example, for a given bit rate.

The encoder 110 may include an entropy encoder that may compress the encoded frames using a first lossless coding methodology. Lossless coding methodologies include those compression methodologies that allow for reconstruction of the original data, as opposed to an approximation of the original data. Examples of lossless coding methodologies may include, but are not limited to, a Huffman compression methodology, a context-adaptive variable length coding (CAVLC) methodology, or a context-adaptive binary arithmetic (CABAC) coding methodology.

As explained above, the interconnect 130 may include the first transcoder 132 and the second transcoder 134. The interconnect 130 be at least a portion of a communication network of the distribution system 100 configured to couple the encoder 110 to the decoder 150. Example of the interconnect 130 coupled between the encoder 110 and the decoder 150 may include a dedicated network, the Internet (a network or networks), flash drives, and/or other storage media. The interconnect 130 may receive the bitstream from the encoder 110 via a transport stream. The first transcoder 132 may be included in the communication network at any point along the transport stream through the interconnect 130. The first transcoder 132 may transcode the bitstream using a second lossless coding methodology to provide a transcoded bitstream, and may provide the transcoded bitstream to the transport stream of the interconnect 130. The second lossless coding methodology may in some examples be a coding methodology that is not supported by the encoder 110. So, for example, the encoder 110 may not utilize CABAC coding. Instead, the encoder 110 may utilize CAVLC or other coding methodologies. CABAC coding may not be a capability of the encoder 110 for power, licensing, or other reasons, for example. The transcoder 132, however, may transcode the encoded bitstream from the encoder 110 using a methodology, such as CABAC, that may not be supported by the encoder 110. In this manner, the interconnect 130 may benefit from the further compressed bitstream because the transcoded bitstream may be further compressed and, therefore, require less bandwidth to be transported through the interconnect 130 (e.g. a network, Internet, or storage medium).

In this manner, video encoded by the encoder 110 may be communicated through at least a portion of the interconnect 130 between the encoder 110 and decoder 150 having been compressed by the second lossless coding methodology (e.g. CABAC), even though such methodology may not be supported by the encoder 110 itself. In some examples, the decoder 150 may also not support decoding of a bitstream compressed using the second lossless coding methodology (e.g. CABAC). Accordingly, a second transcoder 134 may be provided, in some examples, to transcode the bitstream to a bitstream that the decoder 150 is capable of decoding. The second transcoder 134 may receive the transcoded bitstream encoded using the second lossless coding methodology via the transport stream of the interconnect 130. The second transcoder 134 may be included at any point in the communication network along the transport stream of the interconnect 130 following the first transcoder 132. The second transcoder 134 may transcode the transcoded bitstream based on the first lossless coding methodology (or a different methodology in some examples) to provide a second transcoded bitstream suitable for decoding by the decoder 150. In some examples, the second transcoder 134 may receive the bitstream from the transcoder 132 via the transport stream that had been compressed using a CABAC methodology. The second transcoder 134 may transcode the transcoded bitstream into a second transcoded bitstream using a CAVLC methodology, such that it may be decoded by the decoder 150.

The decoder 150 may receive the second transcoded bitstream via the transport stream. The decoder 150 may decode the second transcoded bitstream using a variable-length coding decoder. The decoder 150 may further decode the encoded bitstream using on one or more encoding methodologies or standards, such as MPEG-2, MPEG-4, H.263, H.264, and/or HEVC.

In operation, the encoder 110 may receive frames of video from a channel. As explained above, the encoder 110 may encode the frames of video, and compress the encoded frames into a bitstream using the first lossless coding methodology. In some embodiments, the encoder 110 may have a limited selection of lossless coding methodologies that are available for compressing the encoded frames. For example, the encoder 110 may be limited to non-arithmetic coding methodologies. In an embodiment, the encoder 110 may provide the bitstream encoded based on a CAVLC methodology, and may not support a CABAC methodology.

The interconnect 130 may couple the encoder 110 to the decoder 150 by providing the encoded video frames from the encoder 110 to the decoder 150. The first transcoder 132 may receive the bitstream in the transport stream. In some embodiments, the first transcoder 132 may detect a coding methodology used to encode the bitstream. Responsive to the first transcoder 132 detecting that the bitstream is encoded using the first lossless coding methodology (e.g. CAVLC), the first transcoder 132 may transcode the bitstream using a second lossless coding methodology (e.g. CABAC) to provide a transcoded bitstream that may generally be more compressed than the original bitstream in some examples. Responsive to the first transcoder 132 determining that the bitstream is encoded using a coding methodology other than the first lossless coding methodology (e.g. CAVLC), such as the second lossless coding methodology (e.g. CABAC), the first transcoder 132 may skip transcoding of the bitstream. In some embodiments, the second lossless coding methodology is an arithmetic coding methodology. For example, the second lossless coding methodology may be a context adaptive arithmetic coding methodology, such as a CABAC methodology. Transcoding the bitstream into the transcoded bitstream via the first transcoder 132 may reduce consumed bitstream transport bandwidth and/or may improve visual quality.

The interconnect 130 may provide the transcoded bitstream along the transport stream of the interconnect 130 to the second transcoder 134. In some embodiments, the second transcoder 134 may detect a coding methodology used to encode the transcoded bitstream. Responsive to the second transcoder 134 detecting that the transcoded bitstream is encoded using the second lossless coding methodology (e.g. CABAC), the second transcoder 134 may transcode the transcoded bitstream using the first lossless coding methodology (e.g. CAVLC) to provide a second transcoded bitstream. In some embodiments, the second transcoder 134 may transcode the transcoded bitstream using a lossless coding methodology different from the first lossless coding methodology. Responsive to the second transcoder 134 determining that the transcoded bitstream is encoded based on a coding methodology other than the second lossless coding methodology, such as the first lossless coding methodology, the second transcoder 134 may skip transcoding of the transcoded bitstream, and pass the transcoded bitstream to the decoder 150 directly via the transport stream. In some embodiments, the second transcoder 134 and/or the second transcoder 134 may be implemented using CPUs, memory, and an entropy engine configured to transcode the bitstreams.

The interconnect 130 may provide the second transcoded bitstream at an output. The decoder 150 may decode the second transcoded bitstream received from the interconnect 130 using the first lossless coding methodology. As explained above, the first lossless coding methodology may be a non-arithmetic coding methodology. In some embodiments, the decoder 150 may decode a bitstream that is coded using the second lossless coding methodology. The second transcoder 134 may skip transcoding of the transcode bitstream using the first lossless coding methodology responsive to an indication that the second transcoder 134 is capable of decoding the transcoded bitstream that is encoded using the second lossless coding methodology. The indication may be received from the decoder 150, or may be stored at the second transcoder 134, and/or the interconnect 130.

Transcoding the bitstream from a non-arithmetic coding scheme to an arithmetic coding scheme at the first transcoder 132 for provision over at least a portion of the communication network of the distribution system 100 may reduce bandwidth consumption over the portion, and/or may improve visual quality. For example, coding a bitstream using CABAC may achieve approximately a 10% savings as compared with coding the bitstream using CAVLC.

Figure 2:
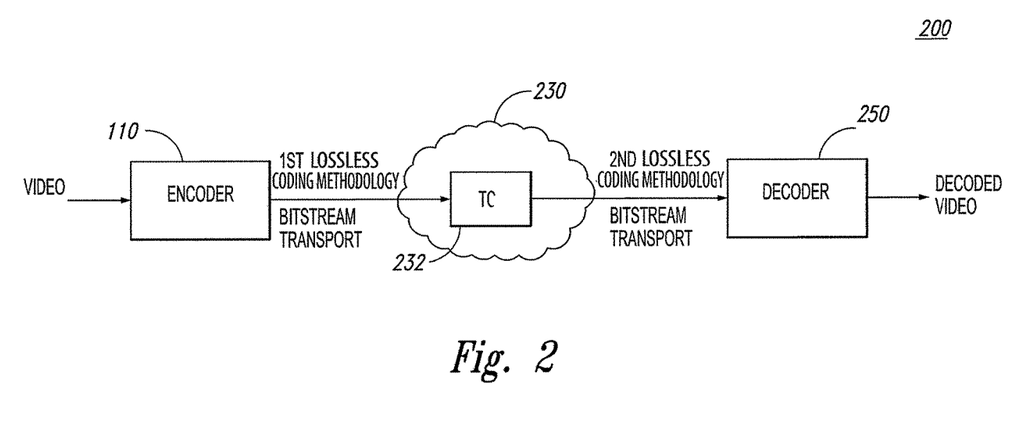
FIG. 2 is a block diagram of a content distribution system including an interconnect having a transcoder according to an embodiment of the disclosure.

FIG. 2 is a block diagram of a content distribution system 200 according to an embodiment of the disclosure. The content distribution system 200 may include an encoder 110 that may provide a bitstream of encoded video content that may be encoded using a first lossless coding methodology to an interconnect 230. The interconnect 230 may transcode the received bitstream using a second lossless coding methodology at a transcoder 232, and provide the transcoded bitstream an output of the interconnect 230 to a decoder 250. The decoder 250 may provide decoded video content by decoding the transcoded bitstream. The encoder 110, the interconnect 230, the transcoder 232, and/or the decoder 250 may be implemented in hardware, software, firmware, or combinations thereof, and may include control logic, logic gates, processors, memory, and/or any combination or sub-combination of the same.

The content distribution system 200 includes elements that have been previously described with respect to the content distribution system encoder 110 of FIG. 1. Those elements have been shown in FIG. 2 using the same reference numbers used in FIG. 1 and operation of the common elements is as previously described. Consequently, a detailed description of the operation of these elements will not be repeated in the interest of brevity. The transcoder 232 may correspond to the first transcoder 132 of FIG. 1.

As explained above, the interconnect 230 may include the transcoder 232. The interconnect 230 be at least a portion of a communication network of the distribution system 200 coupling the encoder 110 to the decoder 250. Examples of the interconnect 230 coupling the encoder 110 and the decoder 250 may include a dedicated network, the internet (e.g., a network or networks), flash drives and/or other storage media. The interconnect 230 may receive the encoded bitstream from the encoder 110 via a transport stream. The transcoder 232 may be included in the communication network at any point along the transport stream of the interconnect 230. The transcoder 232 may transcode the bitstream based on a second lossless coding methodology to provide a transcoded bitstream, and may provide the transcoded bitstream to the transport stream of the interconnect 230. The interconnect 230 may provide transport stream including the transcoded bitstream at an output to the decoder 250.

The decoder 250 may receive the transcoded bitstream provided from the interconnect 230 via the transport stream. The decoder 250 may decode the transcoded bitstream using a variable-length coding decoder. The decoder 250 may further decode the encoded frames based on one or more encoding methodologies or standards, such as MPEG-2, MPEG-4, H.263, H.264, and/or HEVC.

In operation, the encoder 110 may receive frames of video from a video channel. As explained above, the encoder 110 may encode the frames of video, and may compress the encoded frames into a bitstream using the first lossless coding methodology. In some embodiments, the encoder 110 may have a limited selection of lossless coding methodologies that are available for compressing the encoded frames. For example, the encoder 110 may be limited to non-arithmetic coding methodologies. In an embodiment, the encoder 110 may be configured to encode the bitstream using CAVLC.

The interconnect 230 may couple the encoder 110 to the decoder 250 by providing encoded video data in a bitstream from the encoder 110 to the decoder 250. In some embodiments, the transcoder 232 may detect a coding methodology used to encode the bitstream. Responsive to the transcoder 232 detecting that the bitstream is encoded using the first lossless coding methodology, the transcoder 232 may be configured to transcode the bitstream based on a second lossless coding methodology to provide a transcoded bitstream. Responsive to the transcoder 232 determining that the bitstream is encoded using a coding methodology other than the first lossless coding methodology, such as the second lossless coding methodology, the transcoder 232 may skip transcoding the bitstream. In some embodiments, the second lossless coding methodology is an arithmetic coding methodology. For example, the second lossless coding methodology may be a context adaptive arithmetic coding methodology, such as CABAC. Transcoding the bitstream into the transcoded bitstream via the first transcoder 132 may reduce consumed bitstream transport bandwidth and/or may improve visual quality.

The interconnect 230 may provide the transcoded bitstream along the transport stream of the interconnect 230 to an output. The decoder 250 of the content distribution system 200 may have the capability to decode a bitstream that is encoded based on the second lossless coding methodology. As explained above, the second lossless coding methodology may be an arithmetic coding methodology, such as CABAC.

In systems where the encoder 110 is incapable or precluded from encoding using arithmetic coding methodologies and the decoder 250 can decode bitstreams created using arithmetic coding methodologies, transcoding the bitstream from a non-arithmetic coding scheme to an arithmetic coding scheme at the transcoder 232 for provision over a remaining portion of the communication network of the distribution system 200 to the decoder 250 may reduce bandwidth consumption over the portion of the communication network, and/or may improve visual quality. In the embodiment shown in FIG. 2, the decoder 250 is capable of decoding a bitstream encoded using the second lossless coding methodology. Therefore, no further transcoder analogous to the transcoder 134 of FIG. 1 may be needed.

Figure 3:
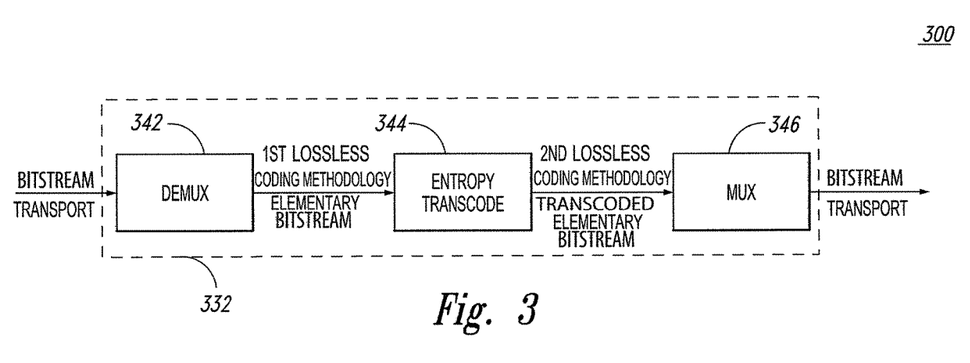
FIG. 3 is a block diagram of a transcoder according to an embodiment of the disclosure according to an embodiment of the disclosure.

FIG. 3 is a block diagram of components used in a transcode operation according to an embodiment of the disclosure. The transcoders 132 of FIGS. 1 and 232 of FIG. 2 may be implemented using the transcoder 332 of FIG. 3 in some examples. An encoded bitstream may be received by the transcoder 332. The encoded bitstream may be packetized in a transport stream. The transcoder 332 may include a de-multiplexer 342 to de-multiplex (e.g., extract) a received bitstream to separate out an elementary bitstream from a first bitstream. The elementary bitstream may include video data encoded using a first lossless coding methodology. The transcoder 332 may include entropy transcoder 344 to encode the elementary stream using a second lossless coding methodology to provide a transcoded elementary bitstream. The transcoder 332 may further include a multiplexer 346 to multiplex (e.g., insert) the transcoded elementary stream into a transport stream provided at the output. The transcoder 332 may be implemented in hardware, software, firmware, or combinations thereof, and may include control logic, logic gates, processors, memory, and/or any combination or sub-combination of the same. The transcoder 332 may correspond to the first transcoder 132 and/or the second transcoder 134 of FIG. 1 and/or the transcoder 232 of FIG. 2.

In operation, the transcoder 332 may de-multiplex 342 the elementary bitstream from the bitstream. The transcoder 332 may be configured to detect a coding methodology used to encode the elementary bitstream. Responsive to the transcoder 332 detecting that the elementary bitstream is encoded based on the first lossless coding methodology, the transcoder 332 may entropy transcode 344 the elementary bitstream using a second lossless coding methodology to provide a transcoded elementary bitstream. The transcoder 332 may multiplex 346 the transcoded elementary bitstream in into a second transport stream provided at an output.

In some embodiments, the elementary bitstream may be coded using a non-arithmetic coding methodology and the transcoder 332 may entropy transcode 344 the elementary bitstream using an arithmetic coding methodology to provide the transcoded elementary bitstream. For example, the first lossless coding methodology may be CAVLC and the second lossless coding methodology may be CABAC. In other embodiments, the elementary bitstream may be coded using an arithmetic coding methodology and the transcoder 332 may entropy transcode 344 the elementary bitstream using a non-arithmetic coding methodology to provide the transcoded elementary bitstream. For example, the first lossless coding methodology may be CABAC and the second lossless coding methodology may be CAVLC.

In some embodiments, the transcoder 332 may skip the entropy transcode 344 of the elementary stream based on an indication that a decoder to which the elementary stream is directed has the capability to decode the bitstream encoded using the first lossless coding methodology. For example, if the elementary bitstream is encoded using an arithmetic methodology and the decoder is capable of (e.g. configured to) decoding a bitstream encoded using the arithmetic methodology, the transcoder 332 may skip the entropy transcode 344 of the elementary bitstream.

Figure 4:
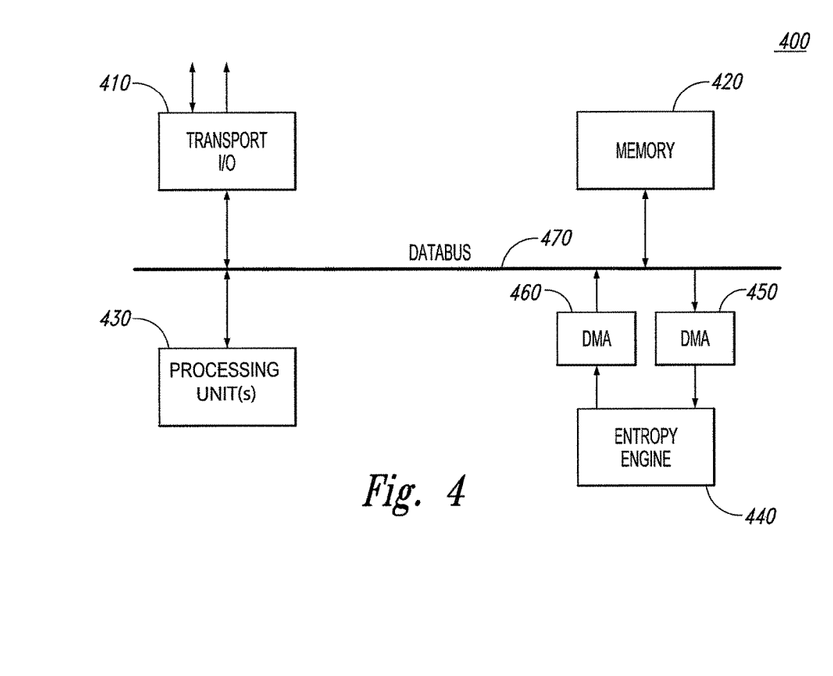
FIG. 4 is a block diagrams of a transcoder according to an embodiment of the disclosure according to an embodiment of the disclosure.

FIG. 4 is a block diagram of a transcoder according to an embodiment of the disclosure. The transcoder 400 may include a transport input/output (I/O) module 410 that may receive bitstreams from and provide bitstreams to a transport stream. The transcoder 400 may further include one or more processing units 430 that may function to extract an elementary bitstream from the received bitstream and to provide the elementary stream to a memory 420 via a data bus 470. The elementary bitstreams may be encoded based using a first lossless coding methodology. The transcoder 400 may further include a pair of direct memory access (DMA) modules 450 and 460 that may provide elementary bitstreams from the memory 420 to a entropy engine 440 and provide transcoded elementary bitstreams from the entropy engine 440 to the memory 420. The entropy engine 440 may transcode the elementary bitstreams using a second lossless coding methodology to provide transcoded elementary bitstreams. Examples of entropy engines suitable for implementing the entropy engine 440 are described, for example, in U.S. Pat. No. 7,061,410, which patent is incorporated by reference herein in its entirety for any purpose. The one or more processing units 430 may retrieve the transcoded elementary bitstream from the memory 420 and insert the transcoded elementary bitstream into a bitstream for transmission via the transport I/O module 410. The transcoder 400 may be implemented in hardware, software, firmware, or combinations thereof, and may include control logic, logic gates, processors, memory, and/or any combination or sub-combination of the same. The transcoder 400 may correspond to the first transcoder 132 and/or the second transcoder 134 of FIG. 1, the transcoder 232 of FIG. 2, and/or the transcoder 332 of FIG. 3.

The transport I/O module 410 may interface with a transport stream. The transport stream may be carried by any suitable medium, including but not limited to, wire mediums, optical mediums, and/or wireless mediums. The transport I/O module 410 may receive bitstreams from the medium and may provide bitstreams to the medium.

The one or more processing units 430 may include a field-programmable gate array (FPGA) device, an application-specific integrated circuit (ASIC), a processing unit such as a central processing unit (CPU), a digital signal processor (DSP), a controller, another hardware device, a firmware device, or any combination thereof. In some embodiments, the one or more processing units 430 may include a hardware acceleration corresponding to one or more designated functions. The one or more processing units 430 may be coupled to the data bus 470 to receive a first bitstream. The one or more processing units 430 may extract (e.g., de-multiplex) an elementary bitstream from the bitstream and may provide the elementary bitstream to the memory 420. The one or more processing units 430 may also retrieve a transcoded elementary bitstream from the memory 420 and insert (e.g., multiplex) the transcoded elementary bitstream into a second bitstream. The bitstream may be provided to the transport I/O module 410.

The memory 420 may include any type of volatile or non-volatile memory. The memory 420 may be coupled to the one or more processing units 430 and to the pair of DMA modules 450 and 460 via the data bus 470. The memory 420 may store elementary bitstreams and transcoded elementary bitstreams responsive to commands from the one or more processing units 430 and/or the pair of DMAs 450 and 460.

The pair of DMA modules 450 and 460 may be coupled to the memory 420 via the data bus 470. The pair of DMA modules 450 and 460 may access the memory 420 independent of the one or more processing units 430. The pair of DMA modules 450 and 460 may provide and receive elementary bitstreams and transcoded elementary bitstreams, respectively, from the entropy engine 440.

The entropy engine 440 may be coupled to the pair of DMA modules 450 and 460 may receive elementary bitstreams that are encoded using a first lossless coding methodology from and provide transcoded elementary bitstreams that are based on a second lossless coding methodology to the memory 420. In some embodiments, the entropy engine 440 may also receive commands from the one or more processing units 430. Responsive to commands from the one or more processing units 430, the entropy engine 440 may transcode an elementary bitstream using the second lossless coding methodology to provide a transcoded elementary bitstream responsive to detecting that the elementary bitstream is encoded based on the first lossless coding methodology. The entropy engine 440 include software and/or a field-programmable gate array (FPGA) device, an application-specific integrated circuit (ASIC), a processing unit such as a central processing unit (CPU), a digital signal processor (DSP), a controller, another hardware device, a firmware device, or any combination thereof.

In operation, the transport I/O module 410 interfaces with the bitstream transport to receive a first bitstream that includes encoded video data. The first bitstream may be provided to the one or more processing units 430 via the data bus 470. The one or more processing units 430 may extract an elementary bitstream from the first bitstream and provide the elementary bitstream to the memory 420 via the data bus 470. The DMA module 450 may retrieve the elementary bitstream from the memory 420 based on commands from the one or more processing units 430 and/or the entropy engine 440 and to provide the elementary bitstream to the entropy engine 440.

The entropy engine 440 may detect a coding methodology used to code the elementary bitstream. If the entropy engine 440 detects that the elementary bitstream is encoded based on the first lossless coding methodology, the entropy engine 440 may transcode the elementary bitstream using the second lossless coding methodology to provide a transcoded elementary bitstream responsive to commands from the one or more processing units 430. If the entropy engine 440 detects that the elementary bitstream is encoded using a coding methodology other than the first lossless coding methodology, such as the second lossless coding methodology, the entropy engine 440 may skip the transcode of the elementary bitstream. The entropy engine 440 may provide the transcoded elementary bitstream to the memory 420 via the DMA module 460.

The one or more processing units 430 may retrieve the encoded bitstream from the memory 420 via the data bus 470. The one or more processing units 430 may insert the transcoded elementary bitstream into a second bitstream and provide the second bitstream to the transport I/O module 410. The transport I/O module 410 may provide the second bitstream, including the transcoded elementary bitstream, to the transport stream.

In some embodiments, the elementary bitstream may be coded using a non-arithmetic coding methodology and the entropy engine 440 may transcode the elementary bitstream using an arithmetic coding methodology to provide the transcoded elementary bitstream. For example, the first lossless coding methodology may be CAVLC and the second lossless coding methodology may be CABAC. In other embodiments, the elementary bitstream may be coded based on an arithmetic coding methodology and the entropy engine 440 may transcode the elementary bitstream using a non-arithmetic coding methodology to provide the transcoded elementary bitstream.

Figure 5:
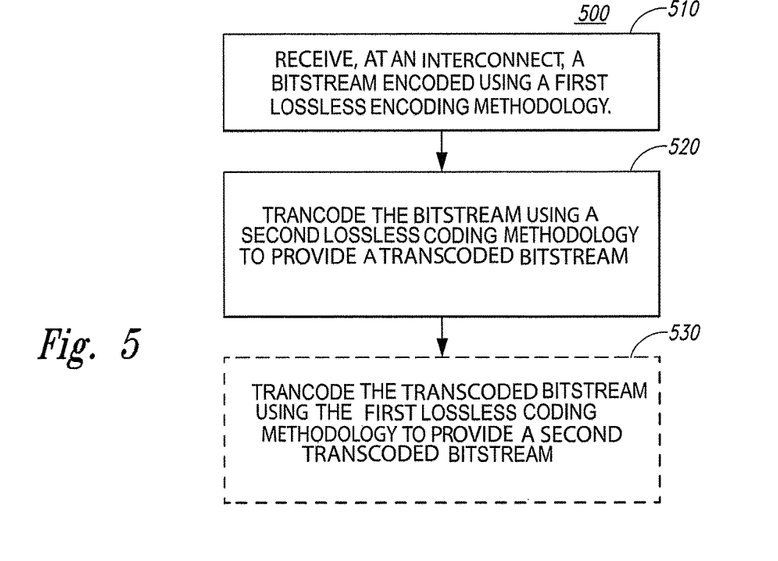
FIG. 5 is a flow diagram of a particular illustrative embodiment of a method of transcoding a bitstream at an interconnect according to an embodiment of the disclosure.

FIG. 5 is a flowchart of a method 500 of transcoding a bitstream at an interconnect according to an embodiment of the disclosure. The method 500 illustrated by the flowchart may be implemented by the interconnect 130 of FIG. 1, the interconnect 230 of FIG. 2, the transcoder 332 of FIG. 3, the transcoder 400 of FIG. 4, or any combination thereof.

The method 500 may include receiving, at an interconnect, a bitstream encoded based on a first lossless coding methodology, at 510. The bitstream may be provided from an encoder, such as the encoder 110 of FIG. 1 and/or the 110 of FIG. 2, via a transport stream that may have been multiplexed at the encoder. The bitstream may include encoded video data (e.g., encoded video frames). The first lossless coding methodology may be a non-arithmetic coding methodology, such as a CAVLAC coding methodology. The encoder may not be capable of encoding the bitstream using a particular coding methodology (e.g. CABAC).

The method 500 may further include transcoding the bitstream using a second lossless coding methodology to provide a transcoded bitstream, at 520. The transcoding may be performed at a transcoder, such as the first transcoder 132 and/or the second transcoder 134 of FIG. 1, the transcoder 232 of FIG. 2, the transcoder 332 of FIG. 3, the transcoder 400 of FIG. 4, or a combination thereof. The method 500 may further include detecting a coding methodology used to encode the bitstream, and, transcoding of the bitstream based on the second lossless coding methodology to provide the transcoded bitstream may be responsive to detecting that the bitstream is encoded based on the first lossless coding methodology. In some embodiments, the method 500 may further include skipping the transcode of the bitstream responsive to detecting that the bitstream is encoded based on a coding methodology other than the first lossless coding methodology, such as the second lossless coding methodology. The second lossless coding methodology may be an arithmetic coding methodology, such as a CABAC methodology.

In some embodiments, the method 500 may further include transcoding the transcoded bitstream based on the first lossless coding methodology to provide a second transcoded bitstream, at 530. The transcoding may be performed at a second transcoder, such as the second transcoder 134 of FIG. 1, the transcoder 332 of FIG. 3, the transcoder 400 of FIG. 4, or a combination thereof. The method 500 may further include providing the second transcoded bitstream from the second transcoder to a decoder. The method 500 may further include detecting a coding methodology used to encode the transcoded bitstream, and transcoding of the transcoded bitstream based on the first lossless coding methodology may be responsive to detecting that the transcoded bitstream is encoded using the second lossless coding methodology. In some embodiments, the method 500 may further include skipping the transcode of the transcoded bitstream using the first lossless coding methodology responsive to detecting the transcoded bitstream is encoded using a coding methodology other than the second lossless coding methodology, such as the first lossless coding methodology. In some embodiments, the method 500 may further include skipping the transcode of the transcoded bitstream using the first lossless coding methodology responsive to an indication that a decoder configured to receive the transcoded bitstream is capable of decoding using the second lossless coding methodology.

In an embodiment, the method 500 may further include providing the transcoded bitstream to a decoder via a transport stream. In other embodiments, the method 500 may further include providing the second transcoded bitstream to the decoder via the transport stream. The decoder may include the decoder 150 of FIG. 1, the decoder 250 of FIG. 2, or a combination thereof.

Figure 6:
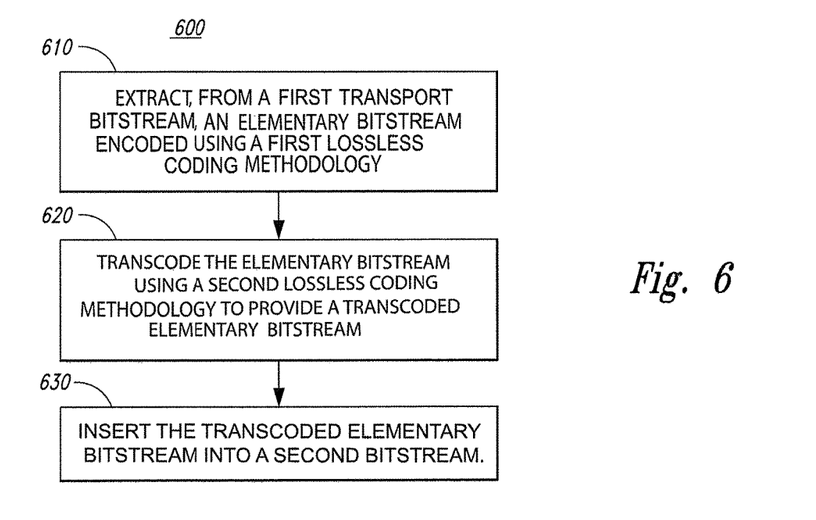
FIG. 6 is a flow diagram of a particular illustrative embodiment of a method of transcoding a bitstream according to an embodiment of the disclosure.

FIG. 6 is a flowchart for a method 600 of transcoding a bitstream at a transcoder according to an embodiment of the disclosure. The method 600 illustrated by the flowchart may be implemented by the first transcoder 132 and/or the second transcoder 134 of FIG. 1, the transcoder 232 of FIG. 2, the transcoder 332 of FIG. 3, the transcoder 400 of FIG. 4, or any combination thereof.

The method 600 may include extracting (e.g., de-multiplexing), from an elementary bitstream, an elementary bitstream that is encoded based on a first lossless coding methodology, at 610. The elementary bitstream may include encoded video data. The method 600 may include receiving the first bitstream at a transport input/output (I/O) module of a transcoder, such as the transport I/O module 410 of the transcoder 400 of FIG. 4. In some embodiments extracting the elementary bitstream may be performed by one or more processing units, such as the one or more processing units 430 of FIG. 4. The method 600 may further include storing the elementary bitstream at a memory, such as the memory 420 of FIG. 4.

The method 600 may further include transcoding the elementary bitstream based on a second lossless coding methodology to provide a transcoded elementary bitstream, at 620. Transcoding the bitstream may be performed at an entropy engine, such as the entropy engine 440 of FIG. 4 and/or the one or more processing units. The method 600 may further include providing the elementary bitstream to the entropy engine and or the one or more processing units. The method 600 may further include storing the transcoded elementary bitstream at the memory. Transcoding the elementary bitstream may be based on commands received from the one or more processing units. In some embodiments the first lossless coding methodology may be a non-arithmetic coding methodology, such as CAVLC, and the second lossless coding methodology may be an arithmetic coding methodology, such as CABAC. In other embodiments, the first lossless coding methodology may be an arithmetic coding methodology, such as CABAC methodology, and the second lossless coding methodology may be a non-arithmetic coding methodology, such as CAVLC.

The method 600 may further include detecting a coding methodology used to encode the elementary bitstream, and transcoding of the elementary bitstream based on the second lossless coding methodology to provide the transcoded elementary bitstream may be responsive to detecting that the elementary bitstream is encoded based on the first lossless coding methodology. In some embodiments, the method 600 may further include skipping the transcode of the elementary bitstream responsive to detecting the elementary bitstream is encoded based on a coding methodology other than the first lossless coding methodology, such as the second lossless coding methodology.

The method 600 may further include inserting (e.g., multiplexing) the transcoded elementary bitstream into a second bitstream, at 630. In some embodiments, inserting the elementary bitstream may be performed by the one or more processing units. The method 600 may further include providing the transcoded elementary bitstream from the memory to the one or more processing units. The method 600 may further include providing the second bitstream from the transport input/output (I/O) module to a bitstream transport.

The methods 500 and 600 may be implemented by a field-programmable gate array (FPGA) device, an application-specific integrated circuit (ASIC), one or more processing units such as a central processing unit (CPU), a digital signal processor (DSP), a controller, another hardware device, a firmware device, or any combination thereof. As an example, the methods 500 of FIG. 5 and/or the method 600 of FIG. 6 may be implemented by a computing system using, for example, one or more processing units that may execute instructions for performing the method that may be encoded on a computer readable medium. The processing units may be implemented using, e.g. processors or other circuitry capable of processing (e.g. one or more controllers or other circuitry). The computer readable medium may be transitory or non-transitory and may be implemented, for example, using any suitable electronic memory, including but not limited to, system memory, flash memory, solid state drives, hard disk drives, etc. One or more processing units and computer readable mediums encoding executable instructions may be used to implement all or portions of encoders, transcoders, or other systems described herein.

Figure 7:
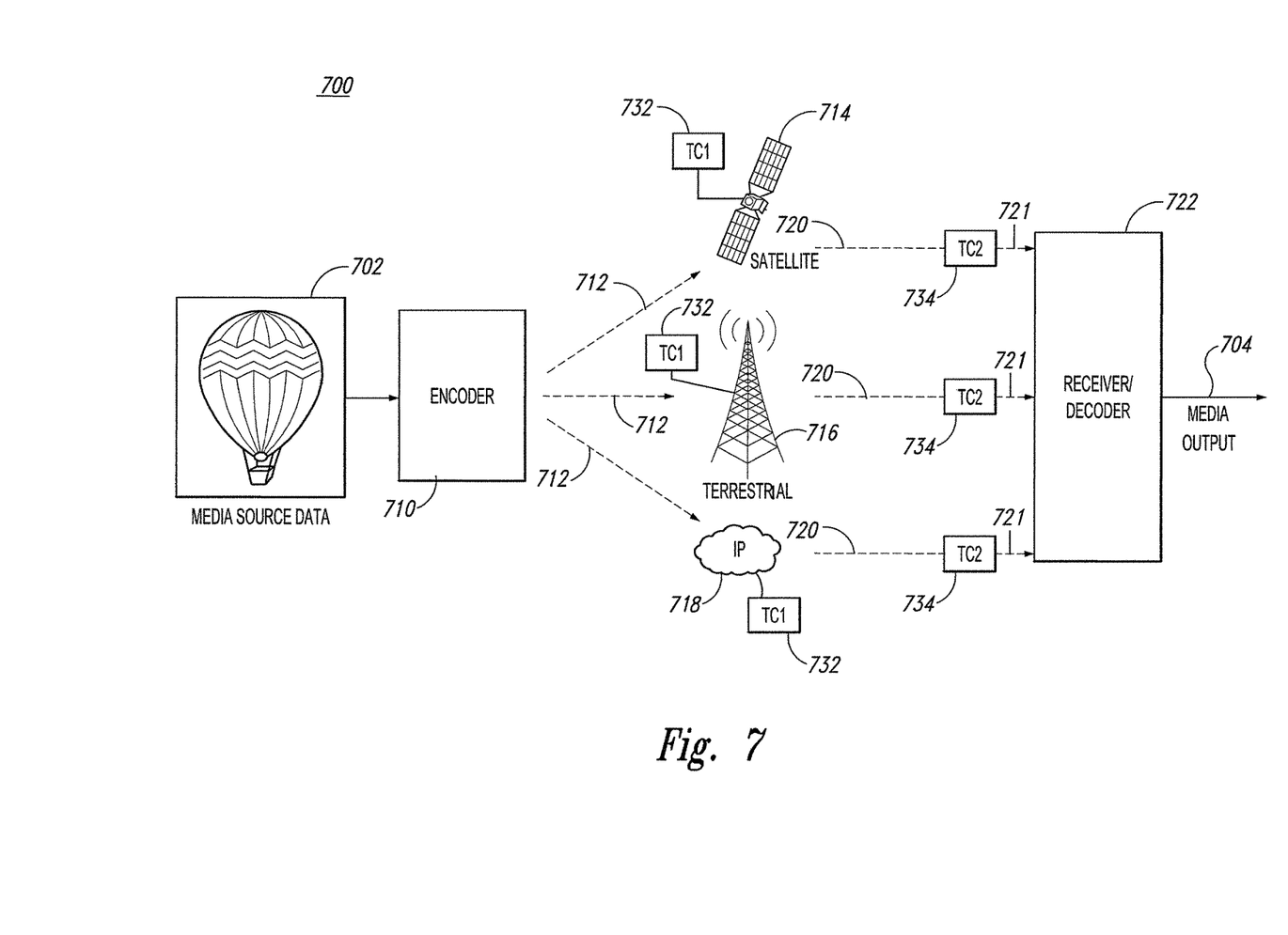
FIG. 7 is a schematic illustration of a media delivery system according to an embodiment of the invention.

FIG. 7 is a schematic illustration of a media delivery system in accordance with embodiments. The media delivery system 700 may provide a mechanism for delivering a media source 702 to one or more of a variety of media output(s) 704. Although only one media source 702 and media output 704 are illustrated in FIG. 7, it is to be understood that any number may be used, and examples may be used to broadcast and/or otherwise deliver media content to any number of media outputs.

The media source data 702 may be any source of media content, including but not limited to, video, audio, data, or combinations thereof. The media source data 702 may be, for example, audio and/or video data that may be captured using a camera, microphone, and/or other capturing devices, or may be generated or provided by a processing device. Media source data 702 may be analog or digital. When the media source data 702 is analog data, the media source data 702 may be converted to digital data using, for example, an analog-to-digital converter (ADC). Typically, to transmit the media source data 702, some type of compression and/or encryption may be desirable. Accordingly, an encoder 710 may be provided that may encode the media source data 702 using any encoding method in the art, known now or in the future, including encoding methods in accordance with video standards such as, but not limited to, MPEG-2, MPEG-4, H.264, HEVC, or combinations of these or other encoding standards. The encoder 710 may be implemented using any encoder described herein, including the encoder 110 of FIG. 1 and the encoder 110 of FIG. 2.

The encoded data 712 may be provided to a communications link, such as a satellite 714, an antenna 716, and/or a network 718. The communications link may correspond to at least a portion of the interconnect 130 of FIG. 1 and/or the interconnect 230 of FIG. 2. The network 718 may be wired or wireless, and further may communicate using electrical and/or optical transmission. The antenna 716 may be a terrestrial antenna, and may, for example, receive and transmit conventional AM and FM signals, satellite signals, or other signals known in the art. The communications link may broadcast the encoded data 712, and in some examples may alter the encoded data 712 and broadcast the altered encoded data 712 (e.g., by transcoding, re-encoding, adding to, or subtracting from the encoded data 712). For example, one of more of the communication links (e.g., the satellite 714, the antenna 716, and/or the network 718) may include a TC1 first transcoder 732 that may be configured to transcode the encoded data 712 coded based on a first lossless coding methodology to encoded data 720 using a second lossless coding methodology. In some embodiments, the first lossless coding methodology may be a non-arithmetic coding methodology (e.g., CAVLC) and the second lossless coding methodology may be an arithmetic coding methodology (e.g., CABAC). The TC1 first transcoder 732 may include the first transcoder 132 and/or the second transcoder 134 of FIG. 1, the transcoder 232 of FIG. 2, the transcoder 332 of FIG. 3, the transcoder 400 of FIG. 4, or any combination thereof.

In some embodiments, the encoded data 720 provided from the communications link may be received by a second transcoder TC2 second transcoder 734. The TC2 second transcoder 734 may be configured to transcode the encoded data 720 coded based on the second lossless coding methodology to encoded data 721 based on the first lossless coding methodology. The TC2 second transcoder 734 may include the first transcoder 132 and/or the second transcoder 134 of FIG. 1, the transcoder 232 of FIG. 2, the transcoder 332 of FIG. 3, the transcoder 400 of FIG. 4, or any combination thereof. The encoded data 721 provided from the TC2 may be received at a receiver 722. In other embodiments, the encoded data 720 provided from the communications link may be received at the receiver 722. The receiver 722 may include or be coupled to a decoder. The decoder may decode the encoded data 720 and/or the encoded data 721 to provide one or more media outputs, with the media output 704 shown in FIG. 7.

The receiver 722 may be included in or in communication with any number of devices, including but not limited to a modem, router, server, set-top box, laptop, desktop, computer, tablet, mobile phone, etc.

The media delivery system 700 of FIG. 7 and/or the encoder 710 may be utilized in a variety of segments of a content distribution industry.

Figure 8:
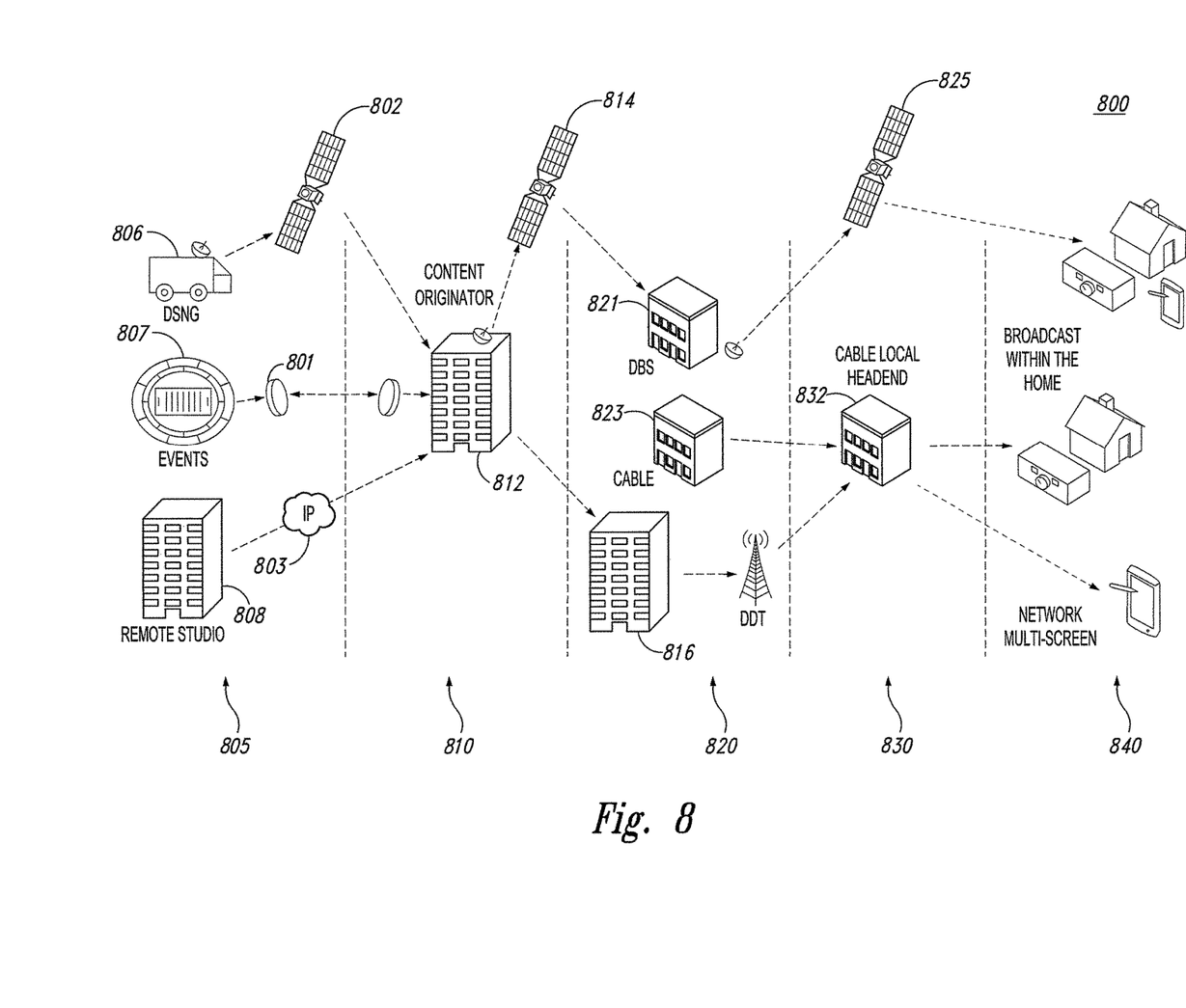
FIG. 8 is a schematic illustration of a video distribution system that may make use of encoders described herein.

FIG. 8 is a schematic illustration of a video distribution system that 800 may make use of transcoders described herein. The video distribution system 800 includes video contributors 805. The video contributors 805 may include, but are not limited to, digital satellite news gathering systems 806, event broadcasts 807, and remote studios 808. Each or any of these video contributors 805 may utilize an encoder described herein, such as the encoder 710 of FIG. 7, to encode media source data and provide encoded data to a communications link. The digital satellite news gathering system 806 may provide encoded data to a satellite 802. The event broadcast 807 may provide encoded data to an antenna 801. The remote studio 808 may provide encoded data over a network 803. One or more of the satellite 802, the antenna 801, and the network 803 may utilize a transcoder described herein, such as the TC1 first transcoder 732 and/or the TC2 second transcoder 734 of FIG. 7, to transcode the encoded data encoded based on a first lossless encoding methodology to encoded data using a second lossless coding methodology.

A production segment 810 may include a content originator 812. The content originator 812 may receive encoded data from any or combinations of the video contributors 805. The content originator 812 may make the received content available, and may edit, combine, and/or manipulate any of the received content to make the content available. The content originator 812 may utilize encoders and transcoders described herein, such as the encoder 710, the TC1 first transcoder 732, and/or the TC2 second transcoder 734 of FIG. 7, to provide encoded data to the satellite 814 (or another communications link). In some embodiments, the satellite 814 may include a transcoder to transcode the encoded data encoded based on a first lossless encoding methodology to encoded data using a second lossless coding methodology. The content originator 812 may provide encoded data to a digital terrestrial television system 816 over a network or other communication link. In some examples, the content originator 812 may utilize a decoder to decode the content received from the contributor(s) 805. The content originator 812 may then re-encode data; potentially utilizing encoders described herein, such as the encoder 710, and provide the encoded data to the satellite 814. In other examples, the content originator 812 may not decode the received data, and may utilize a transcoder to change an encoding format of the encoded data.

A primary distribution segment 820 may include a digital broadcast system 821, the digital terrestrial television system 816, and/or a cable system 823. The digital broadcasting system 821 may include a receiver, such as the receiver 722 described with reference to FIG. 7, to receive encoded data from the satellite 814. The digital terrestrial television system 816 may include a receiver, such as the receiver 722 described with reference to FIG. 7, to receive encoded data from the content originator 812. The cable system 823 may host its own content which may or may not have been received from the production segment 810 and/or the contributor segment 805. For example, the cable system 823 may provide its own media source data 702 as that which was described with reference to FIG. 7.

The digital broadcast system 821 may include an encoder, such as the encoder 710 described with reference to FIG. 7, to provide encoded data to the satellite 825. The cable system 823 and/or the digital terrestrial television system 816 may include an encoder, such as the encoder 710 described with reference to FIG. 7, to provide encoded data over a network or other communications link to a cable local headend 832.

The digital broadcast system 821 and/or the satellite 825 may include a transcoder, such as the TC1 first transcoder 732 and/or the second transcoder 734 of FIG. 7, to transcode the encoded data encoded data encoded based on a first lossless encoding methodology to encoded data based on a second lossless coding methodology. The cable system 823 and/or the digital terrestrial television system 816 may include a transcoder, such as the TC1 first transcoder 732 and/or the second transcoder 734 of FIG. 7, to transcode the encoded data encoded data encoded based on a first lossless encoding methodology to encoded data based on a second lossless coding methodology. A secondary distribution segment 830 may include, for example, the satellite 825 and/or the cable local headend 832.

The cable local headend 832 may include an encoder, such as the encoder 710 described with reference to FIG. 7, to provide encoded data to clients in a client segment 740 over a network or other communications link. The cable local headend 832 may further include a transcoder, such as the TC1 first transcoder 732 and/or the second transcoder 734 of FIG. 7, to transcode the encoded data encoded data encoded based on a first lossless encoding methodology to encoded data based on a second lossless coding methodology. The satellite 825 may broadcast signals to clients in the client segment 840. The client segment 840 may include any number of devices that may include receivers, such as the receiver 722 and associated decoder described with reference to FIG. 7, for decoding content, and ultimately, making content available to users. The devices of the client segment may further include transcoders, such as the TC1 first transcoder 732 and/or the second transcoder 734 of FIG. 7, to transcode the encoded data encoded data encoded based on a first lossless encoding methodology to encoded data based on a second lossless coding methodology. The client segment 840 may include devices such as set-top boxes, tablets, computers, servers, laptops, desktops, cell phones, etc.

Accordingly, encoding, transcoding, and/or decoding may be utilized at any of a number of points in a video distribution system. Embodiments may find use within any, or in some examples all, of these segments.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus comprising:
an interconnect configured to (i) provide encoded video data from an encoder to a decoder and (ii) receive an input bitstream including the encoded video data from the encoder, the interconnect comprising:
a communication link;
a first transcoder configured to (i) detect a type of lossless coding methodology used to generate the input bitstream, (ii) generate intermediate video data by (a) transcoding the encoded video data using a second lossless coding methodology responsive to detecting that the input bitstream is generated using a first lossless coding methodology, (b) copying the encoded video data responsive to detecting that the input bitstream is generated using the second lossless coding methodology and (c) copying the encoded video data responsive to detecting that the input bitstream is generated using a third coding methodology and (iii) transmit the intermediate video data in the communication link, wherein the second lossless coding methodology is different than the third coding methodology; and
a second transcoder located proximate to the decoder and in a different facility remote from the first transcoder, and configured to (i) receive the intermediate video data from the communication link, (ii) receive a signal from the decoder, (iii) detect a type of lossless coding methodology used to generate the intermediate video data and (iv) generate output video data by (a) transcoding the intermediate video data to recreate the input bitstream with the first lossless coding methodology responsive to the signal indicating that the decoder is capable of decoding with the first lossless coding methodology, (b) copying the intermediate video data with the second lossless coding methodology responsive to the signal indicating that the decoder is capable of decoding with the second lossless coding methodology and (c) skipping the transcoding of the intermediate video data responsive to determining that both (1) the intermediate video data is generated using the third coding methodology and (2) the signal indicates that the decoder is capable of decoding with the third coding methodology.

2. The apparatus of claim 1, wherein the first transcoder is further configured to (i) extract an elementary bitstream comprising the encoded video data from the input bitstream, wherein the elementary bitstream is generated using the first lossless coding methodology and (ii) transcode the encoded video data in the elementary bitstream using the second lossless coding methodology to provide the intermediate video data.

3. The apparatus of claim 1, wherein (i) the first lossless coding methodology is a non-arithmetic coding methodology, and (ii) the second lossless coding methodology is an arithmetic coding methodology.

4. The apparatus of claim 1, wherein (i) the first lossless coding methodology is a context-adaptive variable length coding methodology, and (ii) the second lossless coding methodology is a context-adaptive binary arithmetic coding methodology.

5. The apparatus of claim 1, wherein the encoder is unable to encode the input bitstream using the second lossless coding methodology.

6. A method for content distribution, comprising the steps of:
receiving at an interconnect an input bitstream including encoded video data from an encoder, the interconnect comprising (i) a first transcoder, (ii) a communication link and (iii) a second transcoder located proximate to a decoder and in a different facility remote from the first transcoder;
detecting with the first transcoder a type of lossless coding methodology used to encode the input bitstream;
generating intermediate video data by (a) transcoding the encoded video data using a second lossless coding methodology responsive to the first transcoder detecting that the input bitstream is generated using a first lossless coding methodology, (b) copying the encoded video data responsive to detecting that the input bitstream is generated using the second lossless coding methodology and (c) copying the encoded video data responsive to detecting that the input bitstream is generated using a third coding methodology, wherein the second lossless coding methodology is different than the third coding methodology;
transmitting the intermediate video data in the communication link from the first transcoder to the second transcoder;
receiving the intermediate video data at the second transcoder from the communication link;
receiving a signal at the second transcoder from the decoder;
detecting a type of lossless coding methodology used to generate the intermediate video data; and
generating output video data with the second transcoder by (a) transcoding the intermediate video data to recreate the input bitstream with the first lossless coding methodology responsive to the signal indicating that the decoder is capable of decoding with the first lossless coding methodology, (b) copying the intermediate video data with the second lossless coding methodology responsive to the signal indicating that the decoder is capable of decoding with the second lossless coding methodology and (c) skipping the transcoding of the intermediate video data responsive to determining that both (1) the intermediate video data is generated using the third coding methodology and (2) the signal indicates that the decoder is capable of decoding with the third coding methodology.

7. The method of claim 6, further comprising the steps of:
detecting with the second transcoder the type of lossless coding methodology used to generate the intermediate video data; and
skipping the transcode of the intermediate video data in the second transcoder responsive to detecting that both (a) the intermediate video data is generated using a coding methodology other than the second lossless coding methodology and (b) the signal indicates that the decoder is capable of decoding with the coding methodology other than that second lossless coding methodology.

8. The method of claim 6, wherein (i) the first lossless coding methodology is a context-adaptive variable length coding methodology, and (ii) the second lossless coding methodology is a context-adaptive binary arithmetic coding methodology.

9. The method of claim 6, wherein the encoder which generated the input bitstream is unable to encode the input bitstream using the second lossless coding methodology.

10. The method of claim 6, wherein (i) the first lossless coding methodology is a context-adaptive variable length coding methodology, and (ii) the second lossless coding methodology is a context-adaptive binary arithmetic coding methodology.

11. The method according to claim 7, further comprising the steps of:
extracting with the first transcoder an elementary bitstream comprising the encoded video data from the input bitstream, wherein the elementary bitstream is generated using the first lossless coding methodology; and
transcoding the elementary bitstream using the second lossless coding methodology to provide the intermediate video data.

12. The method according to claim 11, further comprising the steps of:
extracting encoded non-video data from the input bitstream with the first transcoder, wherein the encoded non-video data is generated using the first lossless coding methodology;
inserting the intermediate video data and the encoded non-video data into an intermediate bitstream; and
transmitting the intermediate bitstream in the communication link from the first transcoder to the second transcoder.

13. The method according to claim 12, wherein (i) the intermediate bitstream transported across the communication link comprises a plurality of packets, (ii) one or more of the packets are generated with the first lossless coding methodology and (iii) one or more of the packets are transcoded to the second lossless coding methodology.

14. The apparatus according to claim 1, wherein the second transcoder is further configured to (i) detect the type of lossless coding methodology used to generate the intermediate video data and (ii) skip the transcode of the intermediate video data responsive to detecting that both (a) the intermediate video data is generated using a coding methodology other than the second lossless coding methodology and (b) the signal indicates that the decoder is capable of decoding with the coding methodology other than that second lossless coding methodology.

15. The apparatus according to claim 2, wherein the first transcoder is further configured to (i) extract encoded non-video data from the input bitstream, wherein the encoded non-video data is generated using the first lossless coding methodology, (ii) insert the intermediate video data and the encoded non-video data into an intermediate bitstream and (iii) transmit the intermediate bitstream in the communication link to the second transcoder.

16. The apparatus according to claim 15, wherein (i) the intermediate bitstream transported across the communication link comprises a plurality of packets, (ii) one or more of the packets are generated with the first lossless coding methodology and (iii) one or more of the packets are transcoded to the second lossless coding methodology.

17. The apparatus according to claim 4, wherein the third coding methodology is a Huffman compression methodology.

18. The method according to claim 8, wherein the third coding methodology is a Huffman compression methodology.

\* \* \* \* \*